(12) United States Patent
Ota et al.

(10) Patent No.: US 7,841,854 B2
(45) Date of Patent: Nov. 30, 2010

(54) TEMPERATURE ADJUSTMENT MECHANISM FOR INJECTION MOLDING MACHINE

(75) Inventors: Masaya Ota, Aichi (JP); Haruo Yokohama, Aichi (JP); Yasuji Tanaka, Aichi (JP); Yasuo Hirakawa, Aichi (JP); Shinichiro Sekido, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 184 days.

(21) Appl. No.: 12/095,442

(22) PCT Filed: Nov. 20, 2006

(86) PCT No.: PCT/JP2006/323129
§ 371 (c)(1),
(2), (4) Date: May 29, 2008

(87) PCT Pub. No.: WO2007/063733
PCT Pub. Date: Jun. 7, 2007

(65) Prior Publication Data
US 2009/0246304 A1    Oct. 1, 2009

(30) Foreign Application Priority Data
Nov. 30, 2005 (JP) ............................. 2005-347057
Nov. 30, 2005 (JP) ............................. 2005-347058

(51) Int. Cl.
*B29C 45/20* (2006.01)

(52) U.S. Cl. ...................................... 425/549; 264/572
(58) Field of Classification Search ................. 425/547, 425/548, 549, 550, 551; 264/572
See application file for complete search history.

(56) References Cited

U.S. PATENT DOCUMENTS

| 4,781,554 | A | * | 11/1988 | Hendry | ........................ 264/572 |
| 4,894,197 | A | | 1/1990 | Tsutsumi | |
| 5,173,241 | A | * | 12/1992 | Shibuya et al. | ............... 264/572 |
| 5,505,891 | A | * | 4/1996 | Shah | ........................... 264/572 |

FOREIGN PATENT DOCUMENTS

| JP | 63-236615 | 10/1988 |
| JP | 2001-246642 | 9/2001 |
| JP | 2003-211513 | 7/2003 |
| JP | 2004-074803 | 3/2004 |

* cited by examiner

*Primary Examiner*—Tim Heitbrink
(74) *Attorney, Agent, or Firm*—Patterson Thuente Christensen Pedersen, P.A.

(57) ABSTRACT

A temperature adjustment mechanism for use in an injection molding machine that shortens a molding cycle time while preventing the occurrence of a stranding phenomenon in an optimum manner. A passage includes an opening arranged near an outer surface of an outlet of an injection nozzle for an injection molding machine. A supply control unit supplies the passage with at least one of cooling air and heating air to selectively eject the cooling medium, the heating medium, and a mixture of the cooling medium and the heating medium near the outer surface of the outlet.

20 Claims, 9 Drawing Sheets

Resin Circulation Direction ↓

Resin Circulation Direction ↓

Resin Circulation Direction ↓

Resin Circulation Direction ↓

TEMPERATURE ADJUSTMENT MECHANISM FOR INJECTION MOLDING MACHINE

FIELD OF THE INVENTION

The present invention relates to a temperature adjustment mechanism for adjusting the temperature of resin that is injected from an injection molding machine.

BACKGROUND OF THE INVENTION

A typical injection molding machine performs a process for heating and melting (heating and melting process) a molding material (resin chip) in a heating cylinder (injection nozzle) of the injection molding machine. The injection molding machine then injects the molten resin into a mold from the nozzle and charges the mold with the resin (charging process). Subsequently, the injection molding machine cools the resin charged into the mold and removes the solidified resin from the mold (cooling process). The molding processes for one cycle (molding cycle) include the heating and melting process, the charging process, and the cooling process.

In the prior art, there has been a demand for a shorter molding cycle time to improve productivity of molded products. However, the molding cycle time cannot be easily shortened. To shorten the molding cycle time, for example, the time for the cooling process may be shortened. In this case, however, the resin cannot be cut in a desirable manner at an injection outlet of the injection nozzle when the molded product is removed from the mold. As a result, strands of the resin may extend out from the molded product when removing the molded product. When such a stranding phenomenon occurs, the strands would remain in the mold and be mixed with the molded product formed in the next molding cycle. This would increase the defect rate of the molded products and decrease the yield of the molded products. Thus, the stranding phenomenon must be prevented.

In the prior art, Japanese Laid-Open Patent Publication No. 2003-211513 and Japanese Laid-Open Patent Publication No. 2001-246642 propose techniques for preventing the stranding phenomenon.

In detail, Japanese Laid-Open Patent Publication No. 2003-211513 describes a technique for supplying cooling gas to an outer surface of an injection nozzle to lower the temperature at an injection outlet of the injection nozzle. This enables resin to be cut in a desirable manner when a molded product is removed from a mold. As a result, even when shortening the cooling time, the stranding phenomenon is prevented form occurring.

Japanese Laid-Open Patent Publication No. 2001-246642 describes a technique for using a blocking member (bridge member), which is arranged in an injection outlet of a resin passage extending through an injection nozzle, to block the flow of molten resin at the central portion of the resin passage. Normally, solidification of resin starts at an outer portion and ends at a central portion, at which more time is required for cooling. Thus, the arrangement of the blocking member at the injection outlet blocks the flow of molten resin at the central portion of the resin passage in the injection outlet. This accelerates the solidification of the resin. Therefore, even when shortening the cooling time, the stranding phenomenon is prevented form occurring.

Such prior art techniques enable the molding cycle time to be shortened.

However, when cooling the injection nozzle in accordance with the technique described in Japanese Laid-Open Patent Publication No. 2003-211513, the injection nozzle must be heated again to melt the resin in the injection nozzle during the heating and melting process of the next molding cycle. Therefore, when the injection nozzle is cooled, the heating time required to melt the resin slightly increases.

When arranging the blocking member in the resin passage in accordance with the technique described in Japanese Laid-Open Patent Publication No. 2001-246642, the fluidity of the resin in the resin passage decreases as compared with when a blocking member is not used. This increases the time required for the charging process.

Over these recent years, further shortened molding cycle time has become required to further improve the productivity of the molded products. To satisfy such a requirement, loss in time resulting from the heating and melting process and the charging process cannot be ignored.

If the molding cycle time is further shortened by further shortening the cooling time when applying the above-described prior art techniques, the stranding phenomenon would occur and the yield of the molded products would decrease. Therefore, further shortening of the molding cycle time is practically difficult.

SUMMARY OF THE INVENTION

It is an object of the present invention to provide a temperature adjustment mechanism for an injection molding machine that shortens a molding cycle time while appropriately preventing the stranding phenomenon.

A first aspect of the present invention provides a temperature adjustment mechanism for use in an injection molding machine including an injection nozzle for injecting resin material. The temperature adjustment mechanism includes a medium circulation unit which circulates a cooling medium for cooling the resin material in the injection nozzle or a heating medium for heating the resin material to eject the cooling medium or the heating medium. A supply control unit controls supply of the cooling medium and the heating medium into the medium circulation unit so that the cooling medium and the heating medium are selectively ejected from the medium circulation unit.

A second aspect of the present invention provides a temperature adjustment mechanism for use in an injection molding machine including an injection nozzle for injecting a resin material. The temperature adjustment mechanism includes a pipe-shaped medium circulation unit which circulates a cooling medium that cools the resin material in the injection nozzle and which partially extends through the injection nozzle. A supply control unit controls supply of the cooling medium to the medium circulation unit.

DETAILED DESCRIPTION OF THE PREFERRED EMBODIMENTS

A temperature adjustment mechanism for an injection molding machine according to a first embodiment of the present invention will now be described in detail with reference to FIGS. 1 to 3.

Figure 1:
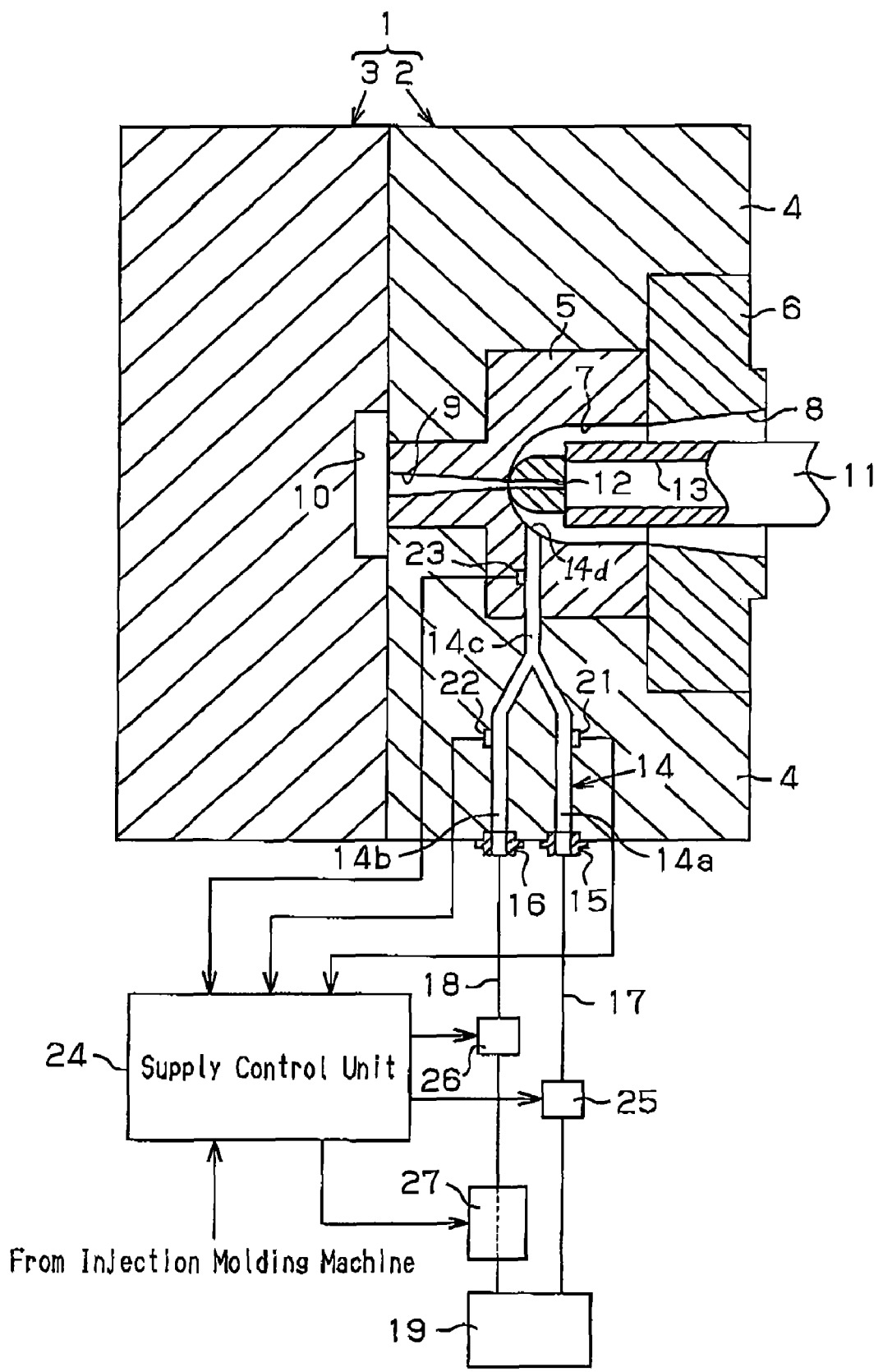
FIG. 1 is a schematic diagram showing the overall structure of a temperature adjustment mechanism for an ejection molding machine according to a first embodiment of the present invention.

As shown in FIG. 1, a mold 1 for injection molding includes a fixed mold 2 and a movable mold 3. The fixed mold 2 is mounted on a fixed platen (not shown). The movable mold 3 is mounted on a movable platen (not shown) and is moveable to come in contact with or be separated from the fixed mold 2.

The fixed mold 2 includes a fixed plate 4, a sprue bushing 5, and a locating ring 6. The fixed plate 4 is mounted on the fixed platen. The sprue bushing 5 is embedded in the fixed plate 4 and comes in contact with the movable mold 3. The locating ring 6 holds the sprue bushing 5 in the fixed plate 4. The sprue bushing 5 has a recess 7. The locating ring 6 has a through-hole 8, which is in communication with the recess 7. A sprue 9 is arranged at the deepest portion of the recess 7 in a manner that the sprue 9 extends to the movable mold 3. A cavity 10, which is in communication with the sprue 9, is formed in the surface of the movable mold 3 facing the fixed mold. The sprue 9 has a diameter that gradually increases toward the movable mold 3. The injection molding machine has an injection nozzle 11 with a distal end accommodated in the recess 7 and extending through the through-hole 8. In detail, the injection nozzle 11 has a distal end defining an injection outlet 12. The injection nozzle 11 further includes a resin passage 13, which is in communication with the injection outlet 12. The injection nozzle 11 is accommodated in the recess 7 in a manner that the injection outlet 12 is alignment with the sprue. The injection nozzle 11 uses a heating mechanism (not shown) to heat and melt a resin material supplied through the resin passage 13. The molten resin is then discharged out of the injection nozzle 11 through the injection outlet 12. As a result, the molten resin flowing through the resin passage 13 is injected out of the injection outlet 12 and into the cavity 10 via the sprue 9.

A medium passage 14, which functions as a medium circulation unit, is formed in the fixed plate 4 and the sprue bushing 5. More specifically, the medium passage 14 supplies a cooling medium and a heating medium into the recess 7 to cool and heat the distal portion of the injection nozzle 11. The medium passage 14 extends through the sprue bushing 5 and the fixed plate 4 and is in communication with the recess 7. The medium passage 14 communicates the recess 7 with the outside of the fixed plate 4. The medium passage 14 includes three passages 14a, 14b, and 14c (14a to 14c). More specifically, the first passage 14a (first medium passage) extends in a direction orthogonal to the direction in which the injection nozzle 11 is inserted into the recess 7. The first passage 14a has an opening formed in an outer surface of the fixed plate 4. The second passage 14b (second medium passage) extends parallel to the first passage 14a and has an opening formed in the outer surface of the fixed plate 4. The third passage 14c (third medium passage) has one end connected to the first passage 14a and the second passage 14b and another end (opening 14d) that is in communication with the recess 7. The opening 14d is arranged near the injection outlet 12. More specifically, the medium flowing in the first passage 14a and the medium flowing in the second passage 14b are mixed in the third passage 14c. The mixture then flows through the third passage 14c. A first port 15 is defined by the opening of the first passage 14a in the fixed plate 4. A second port 16 is defined by the opening of the second passage 14b. The first port 15 is connected to a pump 19, which functions as a medium supplying source, via a first supply passage 17. The second port 16 is connected to the pump 19 via a second supply passage 18. In the first embodiment, the pump 19 supplies air, which functions as a medium, to the supply passages 17 and 18 and the medium passage 14 (the first to third passages 14a to 14c).

A first temperature sensor 21 is arranged in the first passage 14a. A second temperature sensor 22 is arranged in the second passage 14b. A third temperature sensor 23 is arranged in the third passage 14c. The temperature sensors 21 to 23 are electrically connected to a supply control unit (hereafter referred to as the "control unit") 24, which functions as a medium supply control unit.

A first valve 25 is arranged in the first supply passage 17 to control the amount of medium circulated from the pump 19 to the first passage 14a via the passage 17. A second valve 26 is arranged in the second supply passage 18 to control the amount of medium circulated from the pump 19 to the second passage 14b via the passage 18. The valves 25 and 26 are electrically connected to the control unit 24 and control the amount of circulated medium based on a circulation control signal provided from the control unit 24. In the first embodiment, the control unit 24 controls each of the valves 25 and 26 so as to linearly change the open degree.

A temperature adjustment device 27 is further arranged in the second supply passage 18. The temperature adjustment device 27 heats the medium circulated in the second supply passage 18 to a predetermined temperature (e.g., 225° C.). The temperature adjustment device 27 is electrically connected to the control unit 24 and controls the temperature of the medium based on a temperature control signal provided from the control unit 24.

The amount of air circulated in the first supply passage 17 is controlled by the first valve 25. The air is controlled so that a predetermined amount is ejected toward the distal portion of the injection nozzle 11 via the first supply passage 17, the first port 15, the first passage 14a, and the third passage 14c. More specifically, air having a normal temperature flows through the first supply passage 17, the first port 15, and the first passage 14a. In contrast, air having a temperature adjusted by the temperature adjustment device 27 flows through the second supply passage 18. The amount of air circulated in the second supply passage 18 is controlled by the second valve 26. The air is controlled so that a predetermined amount having a predetermined temperature is ejected toward the distal portion of the injection nozzle 11 via the second supply passage 18, the second port 16, the second passage 14b, and the third passage 14c. Thus, air having a high temperature flows through the second supply passage 18, the second port 16, and the second passage 14b. The air supplied to the third supply passage 14c via the first supply passage 17, the first port 15, and the first passage 14a functions as a cooling medium, and the air supplied to the third passage 14c via the second supply passage 18, the second port 16, and the second passage 14b functions as a heating medium. The air flowing in the first passage 14a and the air flowing in the second passage 14b are mixed in the third passage 14c. The air mixture is then ejected toward the distal portion of the injection nozzle 11.

The control unit 24 is formed by a computer unit such including a central processing unit (CPU), a read-only memory (ROM), and a random-access memory (RAM), which are not specifically shown. the control unit 24 controls and drives the valves 25 and 26 and the temperature adjustment device 27 based on an input signal from the injection molding machine or detection signals from the temperature sensors 21 to 23. Thus, the control unit 24 controls supply of the medium in synchronization with the injection molding machine.

In this manner, the medium passage 14, which includes the first to third passages 14a to 14c, the first and second valves 25 and 26, the first and second supply passages 17 and 18, the pump 19, the first to third temperature sensors 21 to 23, and the control unit 24 form a temperature adjustment mechanism for the injection molding apparatus.

An operational example of the temperature adjustment mechanism will now be described in detail with reference to a sequence chart shown in FIG. 2 and a flowchart shown in FIG. 3.

Figure 2:
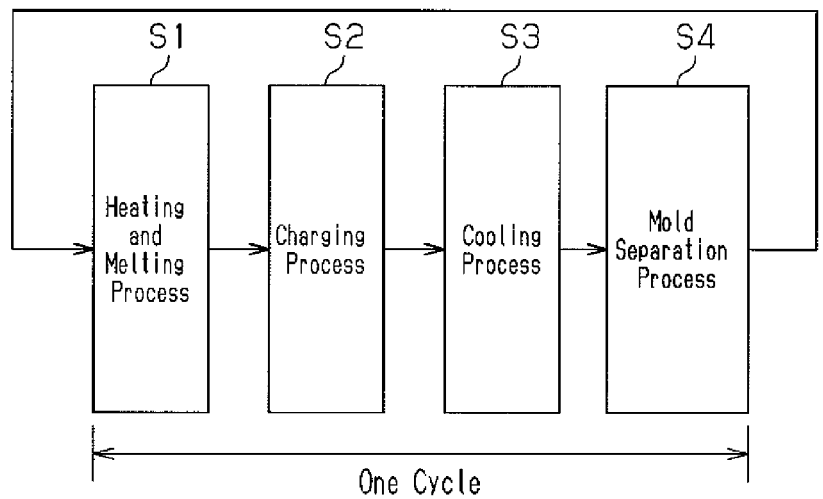
FIG. 2 is a sequence chart showing a molding cycle for the injection molding machine of FIG. 1.

Referring to FIG. 2, molding processes of the injection molding machine are performed in the procedures described below. In step S1, a heating and melting process is performed to melt and heat resin material (resin chip) supplied into the resin passage 13 of the injection nozzle 11 with the heating mechanism. In step S2, a charging process is performed to inject the molten resin from the injection outlet 12 of the injection nozzle 11 into the sprue 9 and charge the cavity 10 with the resin. In step S3, a cooling process is performed to cool and solidify the resin. In step S4, a mold separation process is performed to separate the movable mold 3 from the fixed mold 2 and remove the resin molded product from the cavity 10. Accordingly, the molding processes of the injection molding machine are performed in a single molding cycle of "heating and melting process→charging process→cooling process→mold separation process."

Figure 3:
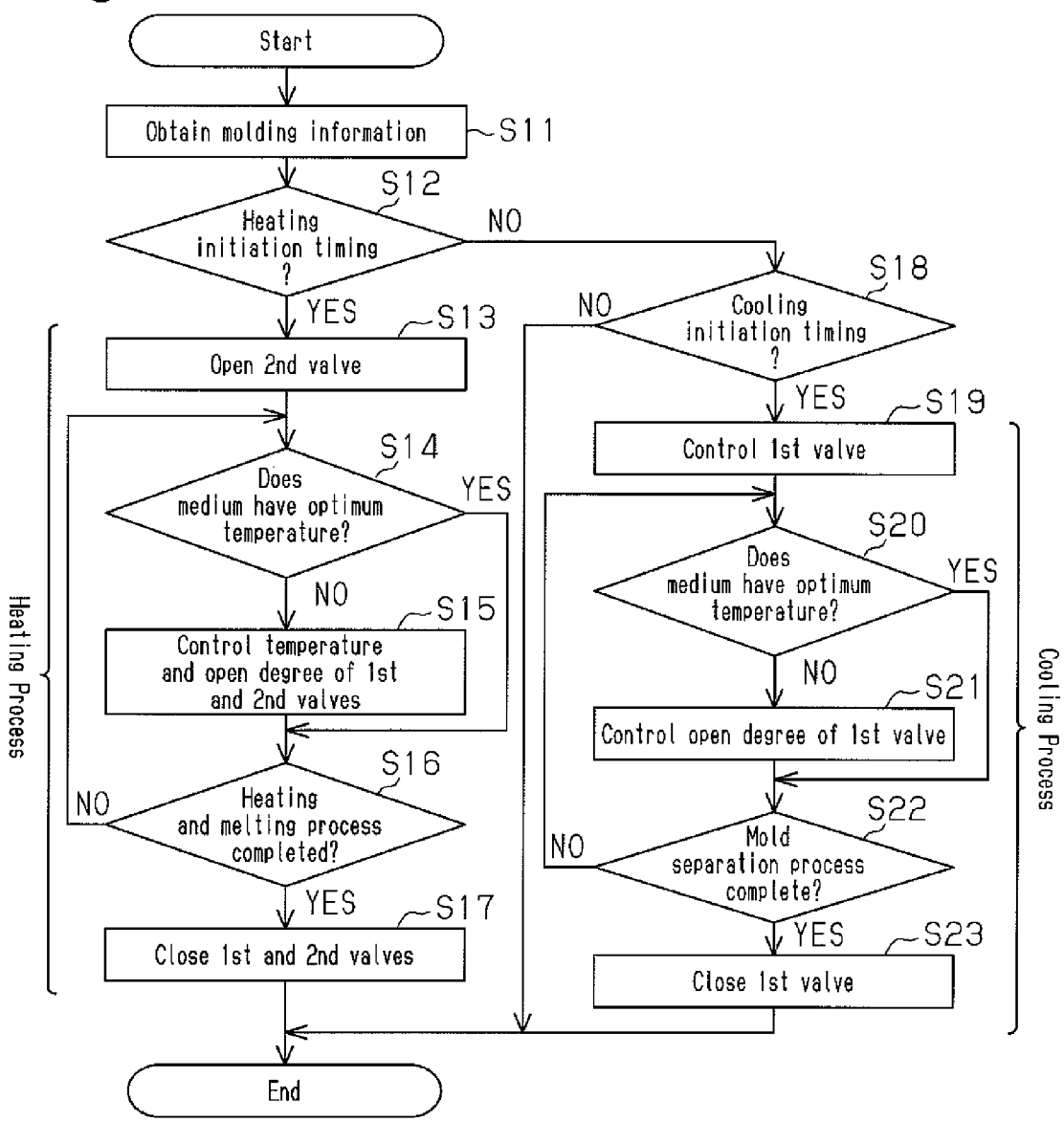
FIG. 3 is a schematic flowchart illustrating temperature adjustment control executed by a supply control unit shown in FIG. 1.

The control unit 24 executes a control routine (temperature adjustment control) shown in FIG. 3 at predetermined interrupt intervals during the molding cycle. As shown in FIG. 3, first in step S11, the control unit 24 obtains various molding information based on an input signal from the injection molding machine. The molding information includes information related to each process in the molding cycle, information related to the resin material, information related to the heating temperature of the injection nozzle 11, information related to the diameter of the injection outlet 12, information related to the size of the resin molded product, information related to the diameter and the length of the sprue 9, and information related to the molded product. The control unit 24 then determines an optimum temperature for the heating medium (heating air) based on the molding information and provides the temperature adjustment device 27 with a temperature control signal for adjusting the heating air to the optimum temperature.

In step S12, the control unit 24 determines whether it is time to initiate heating (heating initiation timing). In the first embodiment, the timing for initiating the heating and melting process is set as the heating initiation timing (the timing for initiating the supply of heating medium). Further, the timing to complete the heating and melting process is set as the heating completion timing (the timing for completing the supplying of heating medium). Thus, the control unit 24 determines whether it is the heating initiation timing based on an input signal from the injection molding machine and performs the heating process in steps S13 to S17 when determining that it is the heating initiation timing.

Heating Process

In step S13, the control unit 24 provides a circulation control signal to the second valve 26 to open the second valve 26. More specifically, the control unit 24 drives the second valve 26 from a fully closed state to a fully open state to supply the heating air to the second supply passage 18, the second port 16, the second passage 14b, and the third passage 14c. This ejects the heating air to the distal portion of the injection nozzle 11. The heating air accelerates the heating of the injection nozzle 11 and melts the resin more quickly. This consequently shortens the time required for the heating and melting process.

In step S14, the control unit 24 determines whether the temperature of the medium (heating medium) is the optimum temperature based on detection signals from the second temperature sensor 22 and the third temperature sensor 23. When the temperature of the heating air is not the optimum temperature, in step S15, the control unit 24 provides the temperature adjustment device 27 with a temperature control signal to control the open degree of each of the valves 25 and 26 and adjust the temperature of the heating air.

In detail, the control unit 24 raises the temperature of the heating air using the temperature adjustment device 27 when the temperature of the heating air is lower than the optimum temperature. The control unit 24 further increases the open degree of the second valve 26 (only when the second valve 26 is not in the fully open state). As a result, the temperature of the heating air increases to the optimum temperature.

Further, the control unit 24 lowers the temperature of the heating air using the temperature adjustment device 27 when the temperature of the heating air is higher than the optimum temperature. The control unit 24 also decreases the open degree of the second valve 26. More preferably, the control unit 24 opens the first valve 25 to circulate the cooling medium (cooling air) in the first supply passage 17. As a result, the cooling air is circulated in the first passage 14a. The mixture of the heating air and the cooling air is circulated in at least the third passage 14c. As a result, the temperature of the medium circulated in the third passage 14c decreases. This adjusts the temperature of the heating air to the optimum temperature. Alternatively, the control unit 24 may adjust the temperature of the heating air simply by controlling the temperature of the air and controlling the open degree of the second valve 26 without opening the first valve 25 in step S15.

When the processing in step S15 ends or when the control unit 24 determines that the medium temperature is the optimum temperature in step S14, the control unit 24 determines whether the heating and melting process performed by the injection molding machine in step S16 has been completed. When the heating and melting process has not been completed, the control unit 24 again performs the processing in step S14. When the heating and melting process has been completed, in step S17, the control unit 24 stops ejecting the medium to the injection nozzle 11 by controlling and switching the valves 25 and 26 from an open state to a fully closed state. The control unit 24 then temporarily terminates processing.

The heating process described above shortens the time required for the heating and melting process. This shortens the molding cycle time.

When determining that it is not the heating initiation timing in step S12, the control unit 24 proceeds to step S18. In step S18, the control unit 24 determines whether it is time to initiate cooling (cooling initiation timing). In the first embodiment, a point of time close to when the charging process is completed is set as the cooling initiation timing (timing for initiating the supply of cooling medium), and the timing at which the mold separation process is completed is set as the cooling completion timing (timing for completing the supply of cooling medium). The control unit 24 determines whether it is the cooling initiation timing based on an input signal from the injection molding machine. When determining that it is not the cooling initiation timing, the control unit 24 temporarily terminates processing. In this case, the control unit 24 determines that it is neither the heating initiation timing nor the cooling initiation timing and executes no control. When determining that it is the cooling initiation timing, the control unit 24 performs the cooling process shown in steps S19 to S23.

Cooling Process

First, in step S19, the control unit 24 provides a circulation control signal to the first valve 25 to open the first valve 25. More specifically, the control unit 24 drives the first valve 25 from the fully closed state to the fully open state to circulate the cooling air (air having a normal temperature) to the first supply passage 17, the first port 15, the first passage 14*a*, and the third passage 14*c*. As a result, the cooling air is ejected to the distal portion of the injection nozzle 11 to cool the distal portion of the injection nozzle 11. The cooling air indirectly cools the molten resin flowing in the injection outlet 12 of the injection nozzle 11 and the resin passage 13. This accelerates the solidification of the resin.

In step S20, the control unit 24 determines whether the medium (cooling air) has an optimum cooling temperature (normal temperature) based on detection signals from the first temperature sensor 21 and the third temperature sensor 23. When the temperature of the cooling air is not the optimum temperature, in step S21, the control unit 24 adjusts the temperature of the cooling air by controlling the open degree of the first valve 25.

In detail, the control unit 24 decreases the open degree of the first valve 25 when the temperature of the cooling air is lower than the optimum temperature. When the temperature of the cooling air is higher than the optimum temperature, the control unit 24 increases the open degree of the first valve 25 (only when the first valve 25 is not in the fully open state). This adjusts the temperature of the cooling air to the optimum temperature.

When the processing in step S21 ends or when the control unit 24 determines that the medium has the optimum temperature in step S20, in step S22, the control unit 24 determines whether the mold separation process performed by the injection molding machine has been completed. When the mold separation process has not been completed, the control unit 24 again performs the processing in step S20. When the mold separation process has been completed, the control unit 24 controls and switches the first valve 25 from the open state to the fully closed state to stop ejecting the medium to the injection nozzle 11. Then, the control unit 24 temporarily terminates processing.

The cooling process performed in this manner accelerates the solidification of the resin between the timing close to when the charging process is completed to when the mold separation process is completed. This consequently shortens the time required for the cooling process. Further, the stranding phenomenon is less likely to occur with the molded product formed through the molding processes including the cooling process when the molded product is removed from the mold. This prevents the resin from remaining in the cavity 10 in the next molding cycle.

In the heating and melting process performed in the next molding cycle, the distal portion of the injection nozzle 11, which has been cooled with the cooling air, is heated with the heating air. This prevents the heating and melting process from being lengthened by cooling and thereby shortens the total molding cycle time in an optimum manner.

The temperature adjustment mechanism of the first embodiment has the advantages described below.

(1) The cooling air ejected via the first passage 14*a* and the third passage 14*c* cools the distal portion of the injection nozzle 11. This indirectly cools the resin flowing in the resin passage 13 and shortens the time required for the resin to solidify. Thus, even when the time required to cool the molded product and remove the molded product from the mold is shortened, the stranding phenomenon is less likely to occur in the molded product. Further, in the heating and molding process performed in the next molding cycle, the heating air supplied via the second passage 14*b* and the third passage 14*c* ejects the distal portion of the injection nozzle 11, which has been cooled in the earlier molding cycle. This accelerates the melting of the resin flowing in the resin passage 13 and shortens the time required for the heating and melting process. This consequently shortens the molding cycle time while preventing the stranding phenomenon. Moreover, the cooling medium and the heating medium are both fluids (air). Thus, the cooling and the heating can be performed using the same structure. This simplifies the structure of the temperature adjustment mechanism as compared with when, for example, performing cooling with a cooling medium and heating with a heater.

(2) The cooling medium and the heating medium flow into the third passage 14*c* via separate medium passages (the first passage 14*a* and the second passage 14*b*). The temperature of the medium ejected to the outer surface of the injection nozzle 11 can be freely adjusted by solely using one of the mediums or by using the mixture of the two mediums. This enables the temperature of the heating medium to be adjusted more quickly as compared with when only using the temperature adjustment device 27.

(3) The control unit 24 controls each of the first valve 25 and the second valve 26 so as to linearly change the open degree. More specifically, the control unit 24 continuously changes the supplied amounts of the cooling air and the heating air. This enables the supplied amount of each medium to be set to an optimum value when the injection nozzle 11 or the resin is cooled or heated. In particular, when mixing the cooling medium and the heating medium to adjust the medium temperature, fine temperature adjustment of the mixture is facilitated.

(4) The timing for initiating heating, which is controlled by the control unit 24, is set as the timing for initiating the heating and melting process. The timing to complete heating is set as the timing to complete the heating and melting process. Thus, the injection nozzle 11 is heated with the heating air only when necessary. This provides effective aid for heating the injection nozzle 11. Further, a point of time close to the timing at which the charging process is completed is set as the cooling initiation timing of the control unit 24. The timing at which the mold separation process is completed is set as the cooling completion timing. In this case, the injection nozzle 11 is cooled with the cooling air in a reliable manner. The molten resin is solidified via the injection nozzle in a reliable manner. This shortens the molding cycle time while preventing the stranding phenomenon of the molded product.

(5) The temperature of the cooling air and the temperature of the heating air are detected by the first to third temperature sensors 21 to 23. The control unit 24 controls the temperature of the cooling air and the temperature of the heating air to optimum temperatures based on the detection results of the sensors 21 to 23. Thus, the cooling and heating control is executed with high accuracy using the medium.

A temperature adjustment mechanism for an injection molding machine according to a second embodiment of the present invention will now be described in detail focusing on differences from the first embodiment with reference to FIG. 4. In the second embodiment, the components of the temperature adjustment mechanism of the second embodiment that are the same as the components in the first embodiment are given the same reference numerals as in the first embodiment.

Figure 4A:
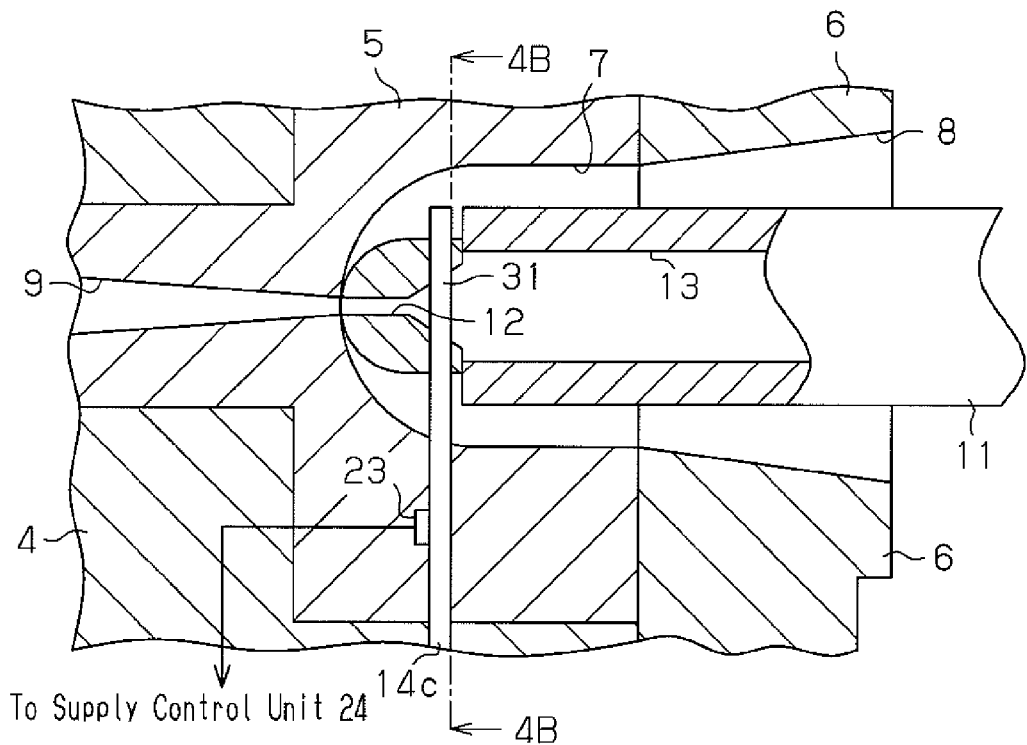
FIG. 4A is a schematic cross-sectional view showing a temperature adjustment mechanism for an injection molding machine according to a second embodiment of the present invention.
Figure 4B:
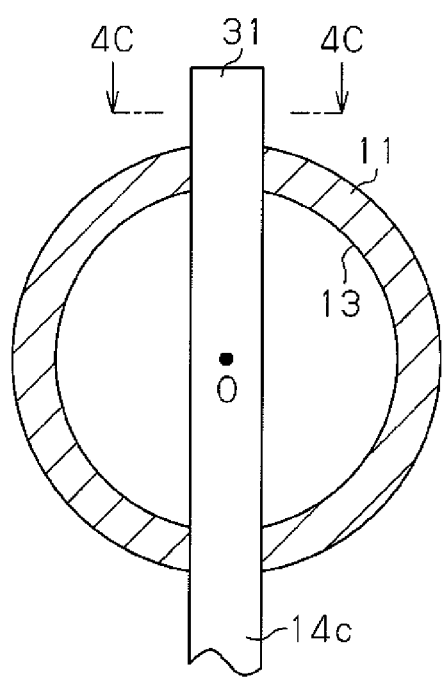
FIG. 4B is a cross-sectional view taken along line 4B-4B in FIG. 4A.
Figure 4C:
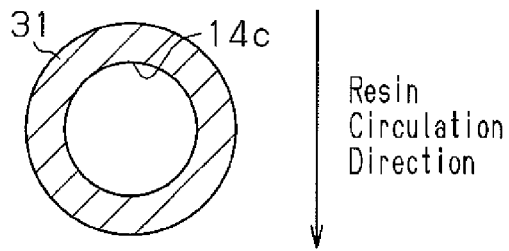
FIG. 4C is a cross-sectional view taken along line 4C-4C in FIG. 4B.

As shown in FIG. 4A, the temperature adjustment mechanism of the second embodiment includes a third passage 14c, which is formed by a pipe 31. The third passage 14c functions as a medium circulation unit. The pipe 31 is substantially cylindrical as shown in FIG. 4C. A third passage 14c is defined in the pipe 31. The pipe 31 is preferably arranged in the recess 7 so as to extend through the distal portion of the injection nozzle 11. In detail, as shown in FIG. 4B, the pipe 31 is arranged in the distal portion of the injection nozzle 11 to extend through the center O of the resin passage 13 in a direction orthogonal to the direction in which the resin is circulated in the resin passage 13. The pipe 31 has a distal end projecting out of the injection nozzle 11. Thus, the cooling air or the heating air flowing in the third passage 14c is discharged out of the injection nozzle 11 after passing through the resin passage 13. The cooling air or the heating air flowing in the pipe 31 cools or heats the resin flowing in the resin passage 13. Thus, in the second embodiment, the resin is cooled and heated more directly than in the first embodiment. This shortens the time required for the heating and melting process and the cooling process.

In the second embodiment, the cross-sectional shape of the pipe 31 does not have to be a perfect circle as shown in FIG. 4C and may be changed to have various shapes.

Figure 5A:
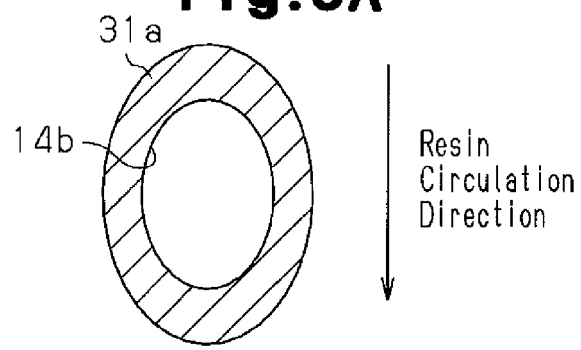
FIG. 5A is a schematic cross-sectional view showing another pipe of the present invention.
Figure 5B:
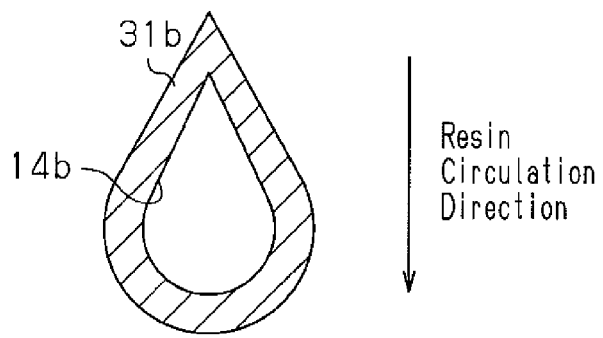
FIG. 5B is a schematic cross-sectional view showing another pipe of the present invention.
Figure 5C:
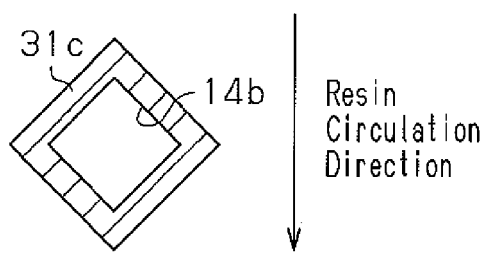
FIG. 5C is a schematic cross-sectional view showing another pipe of the present invention.
Figure 5D:
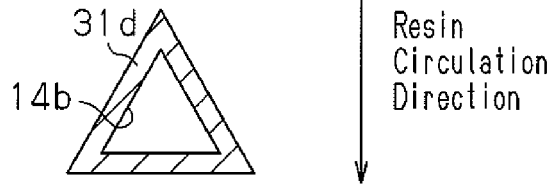
FIG. 5D is a schematic cross-sectional view showing another pipe of the present invention.

For example, FIG. 5A shows a pipe 31a with an oval cross-section. In this case, to increase the area of contact with the resin and smooth the resin flow, it is preferable that the pipe 31a be arranged so that the long axis of the oval is parallel to the direction in which the resin is circulated. As another example, FIG. 5B shows a pipe 31b with a teardrop shape. In this case, it is also preferable that the pipe 31b be arranged in the manner shown in FIG. 5B. As other examples, FIG. 5C shows a pipe 31c with a diamond cross-section, and FIG. 5D shows a pipe 31d with a triangular cross-section. The pipe 14 with the perfect circle cross-section (FIG. 4C) is easily formed. Comparatively, each of the pipes 31a to 31d shown in FIGS. 5A to 5D enables the resin to flow smoothly from the resin passage 13 to the injection outlet 12. Each pipe may be formed to have an enlarged area of contact with the resin so that the resin is effectively cooled (or heated).

Figure 6A:
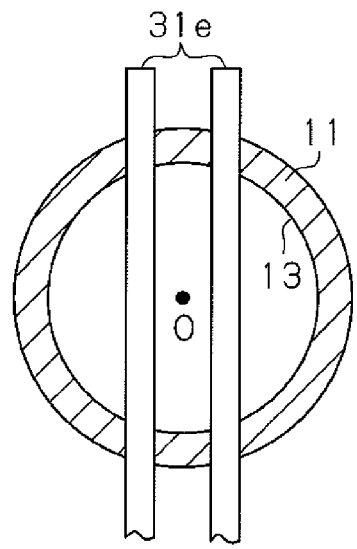
FIG. 6A is a schematic cross-sectional view showing another pipe of the present invention.
Figure 6B:
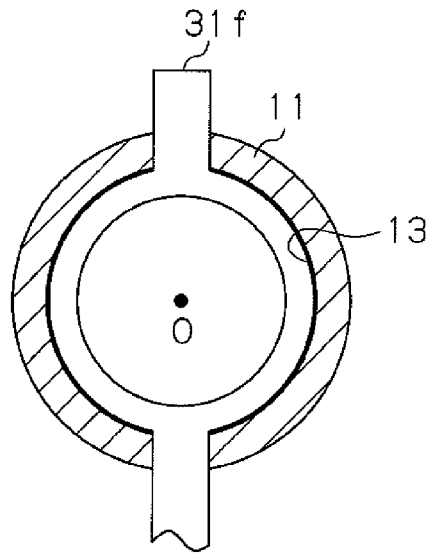
FIG. 6B is a schematic cross-sectional view showing another pipe of the present invention.

Furthermore, the pipe that functions as the medium circulation unit may be arranged to extend through a position separated from the center O of the resin passage 13 (refer to FIG. 4B). For example, FIG. 6A shows pipes 31e, which are two parallel pipes that do not extend through the center O. Further, FIG. 6B shows a pipe f that has an annular portion extending along an inner circumferential surface of the resin passage 13. The pipe f enables the resin to be cooled (or heated) more effectively.

Figure 7:
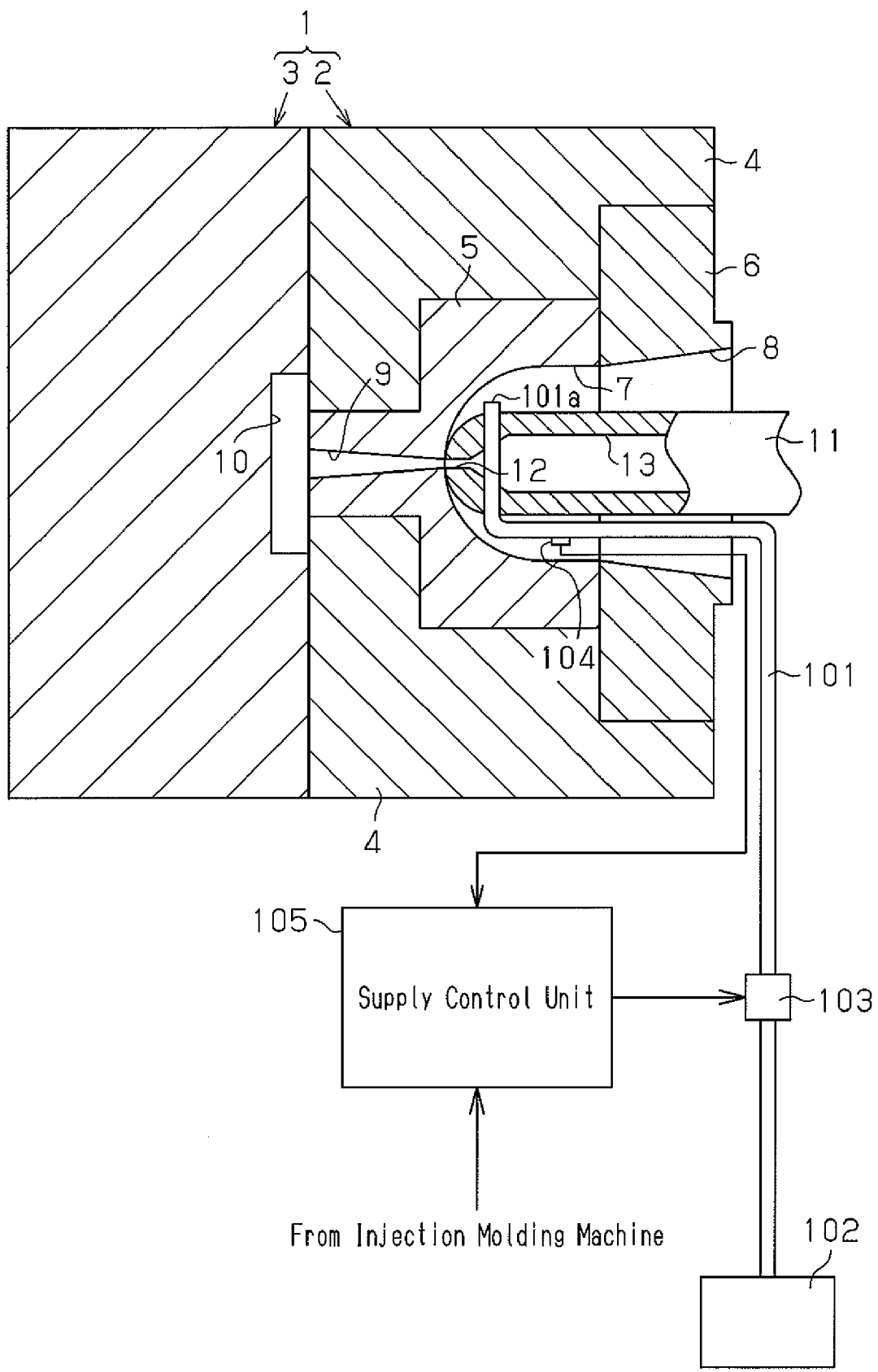
FIG. 7 is a schematic diagram showing the overall structure of a temperature adjustment mechanism for an injection molding machine according to a third embodiment of the present invention.

A temperature adjustment mechanism for an injection molding machine according to a third embodiment of the present invention will now be described in detail focusing on differences from the first and second embodiments with reference to FIGS. 7 and 8. In the third embodiment, the components that are the same as the components in the first embodiment are given the same reference numerals as in the first embodiment.

In the third embodiment, a pipe 101, which functions as a medium circulation unit, is arranged to extend through a distal portion of the injection nozzle 11 (portion near the injection outlet 12). More specifically, the pipe 101 is arranged to extend through the center O (refer to FIG. 4B) of a resin passage 13 in a direction orthogonal to the direction in which the resin is circulated in the resin passage 13. The pipe 101 has a distal end projecting out of the injection nozzle 11 and defining an opening 101a. The opening 101a of the pipe 101 is arranged near the injection outlet 12. The pipe 101 has a precisely circular cross-section. A medium passage is defined in the pipe 101. The pipe 101 has a basal end connected to a pump 102, which is a medium supply source. In the third embodiment, the pump 102 supplies air, which has a normal temperature and functions as a cooling medium, to the medium passage of the pipe 101.

A valve 103 is arranged in the pipe 101 near the pump 102. The valve 103 controls the amount of cooling air circulated through the medium passage in the pipe 101. A temperature sensor 104 is arranged in the pipe 101 near the injection nozzle 11. The temperature sensor 104 detects the temperature of the cooling air flowing through the medium passage. The valve 103 and the temperature sensor 104 are electrically connected to a supply control unit (hereafter referred to as the "control unit") 105, which functions as a medium supply control unit. The valve 103 controls the amount of cooling medium circulated in the medium passage based on a circulation control signal provided from the control unit 105. In the third embodiment, the control unit 105 controls the valve 103 so as to linearly change the open degree.

The valve 103 controls the amount of cooling medium (cooling air) supplied from the pump 102. The cooling air is controlled so that a predetermined circulation amount is discharged out of the pipe 101 through the opening 101a formed at the distal end of the pipe 101 via the medium passage in the pipe 101.

The control unit 105 is specifically formed by a computer unit including a CPU, a ROM, and a RAM (not shown). In the same manner as in the first embodiment, the control unit 105 controls and drives the valve 103 based on an input signal from the injection molding machine and a detection signal from the temperature sensor 104. The control unit 105 controls the supply of the cooling air in synchronization with the injection molding machine.

In the third embodiment, the pipe 101, the pump 102, the valve 103, the temperature sensor 104, and the control unit 105 form the temperature adjustment mechanism for the injection molding machine.

An operation example of the temperature adjustment mechanism with the above-described structure will now be described in detail with reference to the flowchart of FIG. 8.

In the third embodiment, the injection molding machine performs molding processes in accordance with the molding cycle shown in FIG. 2 in the same manner as in the first embodiment. More specifically, one cycle of the molding processes includes the heating and melting process, charging process, cooling process, and mold separation process.

Figure 8:
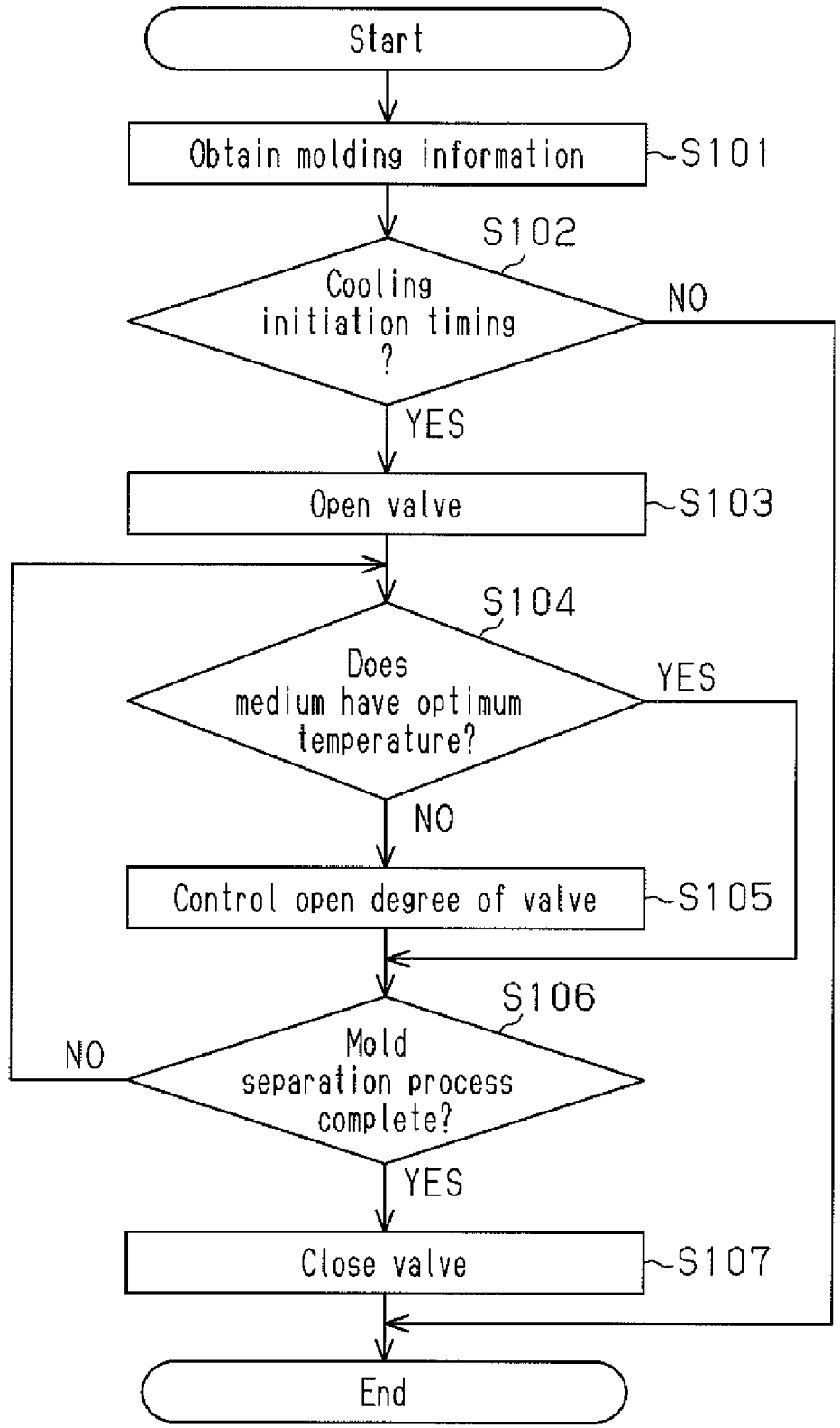
FIG. 8 is a schematic flowchart illustrating temperature adjustment control executed by a supply control unit shown in FIG. 7.

The control unit 105 executes a control routine (temperature adjustment control) shown in FIG. 8 at predetermined interrupt intervals during the molding cycle. As shown in FIG. 8, in step S10, the control unit 105 obtains various molding information based on an input signal from the injection molding machine. The molding information includes information related to each process performed in the molding cycle, information related to a resin material, information related to the heating temperature of the injection nozzle 11, information related to the diameter of the injection outlet 12, information related to the diameter and the length of the sprue 9, and information related to the molded product.

Next, in step S102, the control unit 105 determines whether it is time to initiate heating (heating initiation timing) based on the molding information of the injection molding machine obtained in step S101. In the third embodiment, the control unit 105 calculates the cooling initiation timing (timing for initiating the supply of cooling air) and the cooling completion timing (timing for completing the supply of cooling air) using at least one of the molding information as a displacement parameter. More specifically, in the third embodiment, a point of time close to when the charging process is completed is set as the cooling initiation timing, and the timing at which the mold separation process is completed is set as the cooling completion timing. In step S102, when determining that it is not the cooling initiation timing, the control unit 105 temporarily terminates the processing. In contrast, the control unit 105 performs the cooling process in steps S103 to S107 when determining that it is the cooling initiation timing.

When performing the cooling process, in step S103, the control unit 105 provides a circulation control signal to the valve 103 and opens the valve 103. More specifically, the control unit 105 drives the valve 103 from the fully closed state to the fully open state to circulate the cooling air (air at normal temperature) in the medium passage in the pipe 101. The cooling air flows in the resin passage 13 of the injection nozzle 11 and is discharged out of the pipe 101 from the distal end 101a of the pipe 101. As a result, the cooling air indirectly cools the molten resin flowing in the injection outlet 12 of the injection nozzle 11 and the resin passage 13 and solidifies the resin more quickly.

In step S104, the control unit 105 determines whether the cooling air has the optimum cooling temperature (normal temperature) based on a detection signal from the temperature sensor 104. When the temperature of the cooling air is not the optimum temperature, the control unit 105 controls the open degree of the valve 103 in step S105 to adjust the temperature of the cooling air.

In detail, the control unit 105 decreases the open degree of the valve 103 when the temperature of the cooling air is lower than the optimum temperature. When the temperature of the cooling air is higher than the optimum temperature, the control unit 105 increases the open degree of the valve 103 (only when the valve 103 is not in the fully open state). This adjusts the temperature of the cooling air to the optimum temperature.

When the processing in step S105 has been completed or when the control unit 105 determines that the temperature of the cooling air is the optimum temperature in step S104, in step S106, the control unit 105 determines whether the mold separation process has been completed based on an input signal from the injection molding machine. When the mold separation process has not been completed, the control unit 105 again performs the processing in step S104. When the mold separation process has been completed, in step S107, the control unit 105 controls and switches the valve 103 from the open state to the fully closed state to stop ejecting the cooling air to the injection nozzle 11. Then, the control unit 105 temporarily terminates processing.

In this manner, the cooling process enables the resin to solidify more quickly from a timing close to when the charging process is completed to when the mold separation process is completed. This consequently shortens the time required for the cooling process. Further, the stranding phenomenon is less likely to occur in the molded product formed through the molding processes, which include the cooling process, when the molded product is removed from the mold. As a result, the resin is prevented from remaining in the cavity 10 in the next molding cycle.

The temperature adjustment mechanism of the third embodiment has the advantages described below.

(1) The pipe 101 is arranged to extend through the resin passage 13 of the injection nozzle 11, and the cooling medium (cooling air) is circulated in the medium passage of the pipe 101. Thus, the resin is cooled more directly with the cooling air flowing through the pipe 101 as compared with when the cooling air is supplied to the outer surface of the injection nozzle 11 as in the prior art. Moreover, the pipe 101 is arranged near the injection outlet 12 of the injection nozzle 11. Thus, the resin near the injection outlet 12 is cooled effectively. This shortens the time required for the resin to solidify. Thus, even when the time required to cool the resin and remove the molded product from the mold is shortened, the stranding phenomenon is less likely to occur in the molded product. In other words, the molding cycle time can be shortened while preventing the stranding phenomenon.

(2) The pipe 101 is arranged in a direction orthogonal to the direction in which the resin is circulated in the resin passage 13. Thus, the resin flowing in the resin passage 13 always comes in contact with the pipe 101. When the cooling air is supplied to the pipe 101, this ensures that the resin that comes in contact with the pipe 101 is cooled by the cooling air.

(3) The pipe 101 is arranged to extend through the central portion (center O shown in FIG. 4B in the same manner as in the second embodiment) of the resin passage 13. Thus, the resin flowing in the resin passage 13 is cooled from the central portion. Normally, solidification of the resin starts from an outer portion and ends at a central portion, which does not cool easily. Therefore, by cooling the resin from the central portion, the solidification of the resin can be accelerated. This shortens the time required for the resin to solidify.

(4) The supply initiation timing and the supply completion timing of the cooling air are controlled to and change based on at least one of the resin material, the heating temperature of the injection nozzle, the diameter of the injection outlet, and the size of the resin molded product. This enables the resin to be cooled at an optimum timing.

(5) The pipe 101 is not arranged in the fixed mold 2 but is arranged in the injection nozzle 11. This eliminates the need for changing the shape of the fixed mold 2 when the temperature adjustment mechanism of the third embodiment is used for the injection molding machine. Only the injection nozzle 11 is required to be changed when the temperature adjustment mechanism of the third embodiment is used for the injection molding machine. Accordingly, the temperature adjustment mechanism can be used without requiring significant changes to the structure of the injection molding machine.

(6) The temperature sensor 104 detects the temperature of the cooling air, and the control unit 105 controls the valve 103 based on the detection result to optimize the circulation amount of the cooling air. Thus, the cooling control is executed with high accuracy using the medium.

A temperature adjustment mechanism for an injection molding machine according to a fourth embodiment of the present invention will now be described with reference to FIG. 9 focusing on differences from the first, second, and third embodiments. In the fourth embodiment, the components that are the same as in the first embodiment are given the same reference numerals as in the first embodiment.

The temperature adjustment mechanism of the fourth embodiment differs from the temperature adjustment mechanism of the third embodiment in that a cooling mechanism and a heating mechanism are both employed. The heating mechanism has the same structure as the structure of the heating mechanism described in the first and second embodiments.

Figure 9:
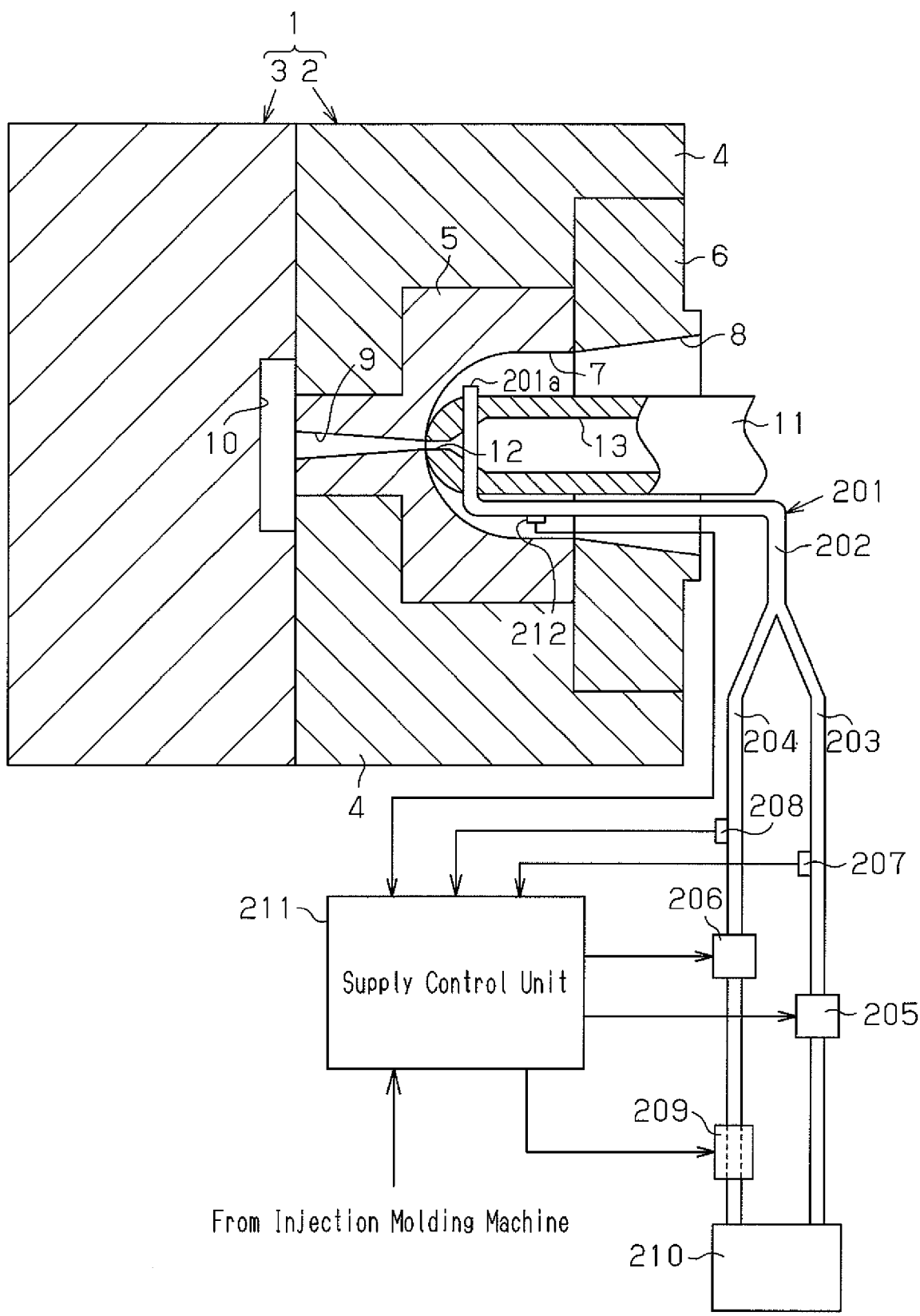
FIG. 9 is a schematic diagram showing the overall structure of a temperature adjustment mechanism for an injection molding machine according to a fourth embodiment of the present invention.

In detail, as shown in FIG. 9, a pipe 201 includes a passage 202, which is arranged to extend through an injection nozzle 11, and two passages 203 and 204, which branch from the passage 202. In the fourth embodiment, the passage (hereafter, referred to as the "first passage") 203 functions as a first medium passage of the present invention. The passage (hereafter, referred to as the "second passage") 204 functions as a second medium passage of the present invention. The passage (hereafter, referred to as the "third passage") 202 functions as a third medium passage of the present invention. The third passage 202 has an opening 201a (opening of the pipe 201), which is formed near the injection outlet 12. The first passage 203 and second passage 204 each have a first end, which is in communication with the third passage 202, and a second end, which is in communication with a pump 210.

A first valve 205 is arranged in the first passage 203. A second valve 206 is arranged in the second passage 204. Each of the valves 205 and 206 is electrically connected to a supply control unit (hereafter referred to as the "control unit") 211. Each of the valves 205 and 206 controls the circulation amount of medium based on a circulation control signal provided from the control unit 211. In the fourth embodiment, the control unit 211 controls the valves 205 and 206 so as to linearly change the open degree.

A first temperature sensor 207 is arranged between the first valve 205 of the first passage 203 and the third passage 202. A second temperature sensor 208 is arranged between the second valve 206 of the second passage 204 and the third passage 202. A third temperature sensor 212 is arranged in the third passage 202. Each of the temperature sensors 207, 208, and 212 is electrically connected to the control unit 211.

A temperature adjustment device 209 is arranged between the second valve 206 of the second passage 204 and the pump 210. The temperature adjustment device 209 heats the medium circulated in the second passage 204 to a predetermined temperature (e.g., 225° C.). The temperature adjustment device 209 is electrically connected to the control unit 211 and controls the temperature of the medium based on a temperature control signal provided from the control unit 211.

The amount of air supplied from the pump 210 to the first passage 203 is controlled by the first valve 205. The predetermined amount of air flows from the first passage 203 to the third passage 202. The temperature of the air supplied from the pump 210 to the second passage 204 is adjusted by the temperature adjustment device 209. The amount of air flowing in the second passage 204 is controlled by the second valve 206. The predetermined amount of air controlled to have a predetermined temperature flows from the second passage 204 to the third passage 202. Thus, the air flowing from the first passage 203 to the third passage 202 functions as the cooling medium, and the air flowing from the second passage 204 to the third passage 202 functions as the heating medium. The air flowing in the first passage 203 and the air flowing in the second passage 204 are mixed in the third passage 202. The air mixture is then ejected into the recess 7 from the opening 201a at the distal end of the pipe 201 (third passage 202), which extends through the injection nozzle 11.

In this manner, in the fourth embodiment, the pipe 201 having the first to third passages 203, 204, and 202, the pump 210, and the first to third temperature sensors 207, 208, and 212, the first and second valves 205 and 206, and the control unit 211 form the temperature adjustment mechanism for the injection molding machine.

The temperature adjustment mechanism of the fourth embodiment with the above-described structure is operated in accordance with the control routine shown in FIG. 3 in the same manner as in the first embodiment.

In detail, the control unit 211 executes the control routine (temperature adjustment control) shown in FIG. 3 during the molding cycle (refer to FIG. 2) performed by the injection molding machine at predetermined interrupt intervals. In this case, the first and second valves 205 and 206 of the fourth embodiment correspond to the first and second valves 25 and 26 of the first embodiment. Further, the first to third passages 203, 204, and 202 of the fourth embodiment correspond to the first to third passages 14a, 14b, and 14c of the first embodiment. The first to third temperature sensors 207, 208, and 212 of the fourth embodiment correspond to the first to third temperature sensors 21 to 23 of the first embodiment.

In addition to advantages (1) to (6) of the third embodiment, the temperature adjustment mechanism of the fourth embodiment has the advantages described below.

(7) In addition to the cooling air, the heating air also is also circulated in the third passage 202 of the pipe 201, which is arranged to extend through the resin passage 13 of the injection nozzle 11. The heating air is supplied in the heating and melting process to heat the injection nozzle 11 and melt the resin in the resin passage 13. The heating air accelerates the melting of the resin flowing in the resin passage 13. Further, the distal portion of the injection nozzle 11 that has been cooled in the earlier molding cycle is heated with the heating air ejected to the injection nozzle 11 in the heating and melting process of the next molding cycle. This structure not only shortens the time required for the cooling process but also shortens the time required for the heating and melting process. Thus, the molded cycle time is shortened while preventing the stranding phenomenon of the molded product.

The cooling medium and the heating medium are both fluids (air). Thus, the same structure can be used for cooling and heating. This simplifies the structure of the temperature adjustment mechanism as compared with when, for example, the resin is cooled using the cooling medium and heated using a heating means such as a heater.

(8) The cooling air and the heating air flow into the third passage 202 via separate medium passages (the first passage 203 and the second passage 204). Thus, the temperature of the medium circulated in the resin passage 13 can be adjusted freely either by solely using one of the cooling air or the heating air or by using the mixture of the cooling air and the heating air. As compared with when only the temperature adjustment device 209 is used, the temperature of the heating air is quickly adjusted.

(9) The control unit 211 controls each of the first valve 205 and the second valve 206 so as to linearly change the open degree. More specifically, the control unit 211 continuously changes the supplied amounts of the cooling air and the heating air. This enables the supplied amount of each medium to be set to an optimum value when the injection nozzle 11 or the resin is cooled or heated. In particular, when mixing the cooling medium and the heating medium to adjust the medium temperature, fine temperature adjustment of the mixture is facilitated.

(10) In the same manner as for the cooling air, the supply initiation timing and the supply completion timing of the heating air are also controlled to change based on at least one of the resin material, the heating temperature of the injection nozzle, the diameter of the injection outlet, and the size of the resin molded product. This enables the resin to be heated at an optimum heating timing.

(11) The temperature of the cooling air and the temperature of the heating air are detected by the first to third temperature sensors 207, 208, and 212. The control unit 212 controls the temperature of the cooling air and the temperature of the heating air to optimum temperatures based on the detection result of each of the sensors 207, 208, and 212. Thus, the cooling control and the heating control are executed with high accuracy using the medium.

The present invention may be modified in the following manner.

Figure 10A:
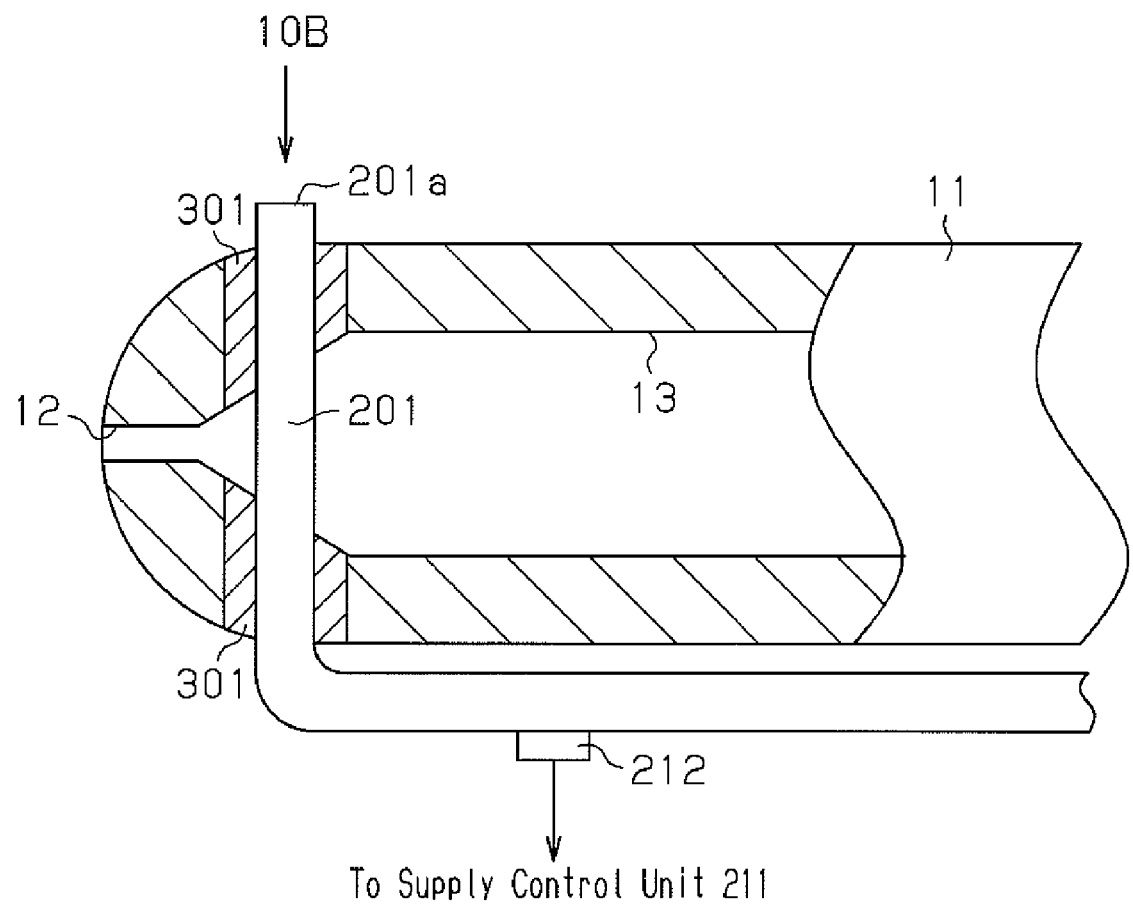
FIG. 10A is a schematic cross-sectional view showing another injection nozzle of the present invention.
Figure 10B:
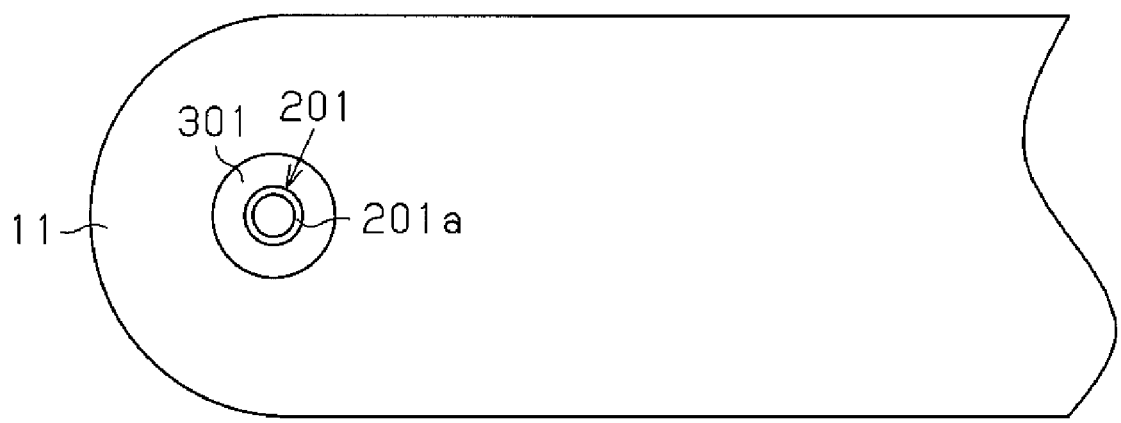
FIG. 10B is a plan view taken from a direction indicated by arrow 10B in FIG. 10A.

In the fourth embodiment, a bushing 301, which is made of an insulating material, may be arranged between the injection nozzle 11 and the pipe 201 as shown in FIGS. 10A and 10B. This reduces thermal impact between the injection nozzle 11 and the pipe 201 and enables temperature control to be performed with higher accuracy.

In each of the above embodiments, the air (the cooling medium or the heating medium or both) may be re-circulated to the pump. This enables a liquid, such as water, or a material that is not environmentally friendly, such as chlorofluorocarbon, to be easily used as the cooling medium or the heating medium.

In each of the above embodiments, the control unit (24, 105, and 211) may freely change at least one of the heating initiation timing, the heating end timing, the cooling initiation timing (only the first, second, and fourth embodiments) and the cooling completion timing (only the first, second, and fourth embodiments) based on, for example, molding information provided from the injection molding machine or a parameter input by the operator.

In each of the above embodiments, the open degree of the valve may be changed in a binary manner between the fully closed state and the fully open state. This simplifies the valve control executed by the control unit (24, 105, and 211).

The temperature of the cooling air is not limited to the normal temperature but may be an adjusted temperature (e.g., a temperature higher than or equal to the normal temperature), which is adjusted by the temperature adjustment device (27 and 209).

In the first, second, and fourth embodiments, the temperature adjustment device (27 and 209) may be eliminated. For example, in the first and second embodiments, the second supply passage 18 may be arranged near the injection nozzle 11, and the temperature of the heating air flowing in the second supply passage 18 may be adjusted using the heat of the injection nozzle 11. In the same manner, the temperature of the heating air flowing in the pipe 201 (first passage 202) may be adjusted using the heat of the injection nozzle 11.

In the first embodiment, the medium passage 14 may include only the third passage 14c. In this case, it is preferable that the control unit 24 selectively supplies the cooling air and the heating air into the third passage 14c.

In the third embodiment, the control unit 105 may selectively supply the cooling air and the heating air into the pipe 101.

In the first embodiment, the medium passage 14 may include only the first passage 14a and the second passage 14c. In this case, the passages 14a and 14b are each in communication with the recess 7.

In the above embodiments, the temperature sensor may be eliminated. This simplifies the structure of the temperature adjustment mechanism and further reduces the processing load on the control unit.

The control routine for the temperature adjustment control is not limited to the interrupt routine executed at predetermined interrupt intervals as shown in FIGS. 3 and 8. For example, in the control routine shown in FIG. 3, the processing may return to step S12 after the execution of steps S17 and S23. In the same manner, in the control routine shown in FIG. 8, the processing may return to step S102 after step S107. In this case, the supply control unit 24, 105, or 211 intermittently executes the temperature adjustment control throughout the molding cycle.

Technical concepts understood from the embodiments and modifications described above other are listed below.

(1) The temperature adjustment device, wherein the cooling medium and the heating medium are air. With technical concept (1), the cooling medium and the heating medium may be obtained at low cost.

(2) The temperature adjustment mechanism according to technical concept (1), wherein the temperature of the air that functions as the cooling medium is the normal temperature. Technical concept (2) eliminates the need for the structure for positively cooling the cooling medium.

(3) The temperature adjustment mechanism according to any one of technical concepts (1) and (2), where in the medium circulation unit includes a temperature detection unit for detecting the temperature of the medium flowing in the medium circulation unit, and the supply control unit adjusts the temperature of the medium flowing in the medium circulation unit based on a detection signal from the temperature detection unit. Technical concept (3) enables the temperature of the medium flowing in the medium circulation unit to be adjusted in an optimum manner.

(4) The temperature adjustment mechanism, wherein a heat insulation bushing is arranged between the injection nozzle and the medium circulation unit.

(5) A manufacturing method for a resin molded product comprising a heating and melting process for heating and melting a resin material in an injection nozzle of an injection molding machine, a charging process for charging molten resin from the injection nozzle to charge a mold with the resin, a cooling process for cooling and solidifying the resin charged in the mold and removing the solid resin from the mold, wherein among the processes, at least the cooling process cools resin near the medium circulation unit by circulating a cooling medium in a pipe-shaped medium circulation unit arranged in the injection nozzle.

(6) The method according to technical concept (5), wherein a supply initiation timing and a supply completion timing of the cooling medium are changed based on at least one of the resin material, a heating temperature of the injection nozzle, a diameter of an outlet of the resin, a diameter of a sprue, and a size of the resin molded product.

The invention claimed is:

1. A temperature adjustment mechanism for use in an injection molding machine including an injection nozzle for injecting resin material, the temperature adjustment mechanism comprising:
   a medium circulation unit which selectively circulates a cooling medium and a heating medium in the medium circulation unit; and
   a supply control unit which controls supply of the cooling medium and the heating medium into the medium circulation unit so that the cooling medium and the heating medium are selectively ejected from the medium circulation unit,
   wherein the medium circulation unit includes an opening for ejection, the opening to allow circulation of said mediums around the injection nozzle.

2. The temperature adjustment mechanism according to claim 1, wherein:
   the medium circulation unit is arranged so as to selectively eject the cooling medium and the heating medium toward an outer surface of the outlet.

3. The temperature adjustment mechanism according to claim 1, wherein:
   the injection nozzle includes a resin passage which is in communication with the outlet and circulates the resin material; and
   the medium circulation unit partially extends through the resin passage.

4. The temperature adjustment mechanism according to claim 1, wherein the supply control unit simultaneously supplies the heating medium and the cooling medium into the medium circulation unit so that a mixture of the cooling medium and the heating medium is ejected as the heating medium from the medium circulation unit.

5. The temperature adjustment mechanism according to claim 1, wherein the medium circulation unit includes:
   a first medium passage which circulates the cooling medium;
   a second medium passage which circulates the heating medium; and
   a third medium passage which is in communication with the first medium passage and the second medium passage and which ejects the medium circulated in the third medium passage via the first medium passage and the second medium passage.

6. The temperature adjustment mechanism according to claim 1, wherein the supply control unit continuously changes a supplied amount of each of the cooling medium and the heating medium.

7. The temperature adjustment mechanism according to claim 1, wherein the supply control unit controls the supply of the cooling medium and the heating medium to the medium circulation unit by switching to either one of a supply state and a supply completion state.

8. The temperature adjustment mechanism according to claim 1, wherein the supply control unit controls a supply initiation timing and a supply completion timing of the heating medium using a displacement parameter that is at least one of information related to a molding cycle of the injection molding machine, information related to the resin material, information related to a temperature to which the injection nozzle is heated, information related to a diameter of the outlet, information related to a diameter of a sprue formed in the mold, information related to a length of the sprue, and information related to a molded product formed by the mold.

9. A temperature adjustment mechanism for use in an injection molding machine including an injection nozzle for injecting a resin material, the temperature adjustment mechanism comprising:
   a pipe-shaped medium circulation unit which circulates a cooling medium that cools the resin material in the injection nozzle and which partially extends through the injection nozzle; and
   a supply control unit which controls supply of the cooling medium to the medium circulation unit,
   wherein the medium circulation unit includes an opening for ejection, the opening to allow circulation of said mediums around of the injection nozzle.

10. The temperature adjustment mechanism according to claim 9, wherein:
   the injection nozzle includes a resin passage which is in communication with the outlet and circulates the resin material; and
   the medium circulation unit is arranged so that the medium circulation unit partially extends through the outlet in a direction intersecting a circulation direction of the resin material circulated in the resin passage.

11. The temperature adjustment mechanism according to claim 10, wherein the medium circulation unit partially extends through a central portion of the resin passage.

12. The temperature adjustment mechanism according to claim 9, wherein the supply control unit controls a supply initiation timing and a supply completion timing of the cooling medium using a displacement parameter that is at least one of information related to a molding cycle of the injection molding machine, information related to the resin material, information related to a temperature to which the injection nozzle is heated, information related to a diameter of the outlet, information related to a diameter of a sprue formed on the mold, information related to a length of the sprue, and information related to a molded product formed using the mold.

13. The temperature adjustment mechanism according to claim 9, wherein the supply control unit supplies a heating medium into the medium circulation unit in addition to the cooling medium and controls supply of the cooling medium and the heating medium into the medium circulation unit.

14. The temperature adjustment mechanism according to claim 2, wherein the supply control unit simultaneously supplies the heating medium and the cooling medium into the medium circulation unit so that a mixture of the cooling medium and the heating medium is ejected as the heating medium from the medium circulation unit.

15. The temperature adjustment mechanism according to claim 2, wherein the medium circulation unit includes:
   a first medium passage which circulates the cooling medium;
   a second medium passage which circulates the heating medium; and
   a third medium passage which is in communication with the first medium passage and the second medium passage and which ejects the medium circulated in the third medium passage via the first medium passage and the second medium passage.

16. The temperature adjustment mechanism according to claim 2, wherein the supply control unit continuously changes a supplied amount of each of the cooling medium and the heating medium.

17. The temperature adjustment mechanism according to claim 2, wherein the supply control unit controls the supply of the cooling medium and the heating medium to the medium circulation unit by switching to either one of a supply state and a supply completion state.

18. The temperature adjustment mechanism according to claim 2, wherein the supply control unit controls a supply initiation timing and a supply completion timing of the heating medium using a displacement parameter that is at least one of information related to a molding cycle of the injection molding machine, information related to the resin material, information related to a temperature to which the injection nozzle is heated, information related to a diameter of the outlet, information related to a diameter of a sprue formed in the mold, information related to a length of the sprue, and information related to a molded product formed by the mold.

19. The temperature adjustment mechanism according to claim 10, wherein the supply control unit controls a supply initiation timing and a supply completion timing of the cooling medium using a displacement parameter that is at least one of information related to a molding cycle of the injection molding machine, information related to the resin material, information related to a temperature to which the injection nozzle is heated, information related to a diameter of the outlet, information related to a diameter of a sprue formed on the mold, information related to a length of the sprue, and information related to a molded product formed using the mold.

20. The temperature adjustment mechanism according to claim 10, wherein the supply control unit supplies a heating medium into the medium circulation unit in addition to the cooling medium and controls supply of the cooling medium and the heating medium into the medium circulation unit.

* * * * *